United States Patent Office 3,375,190
Patented Mar. 26, 1968

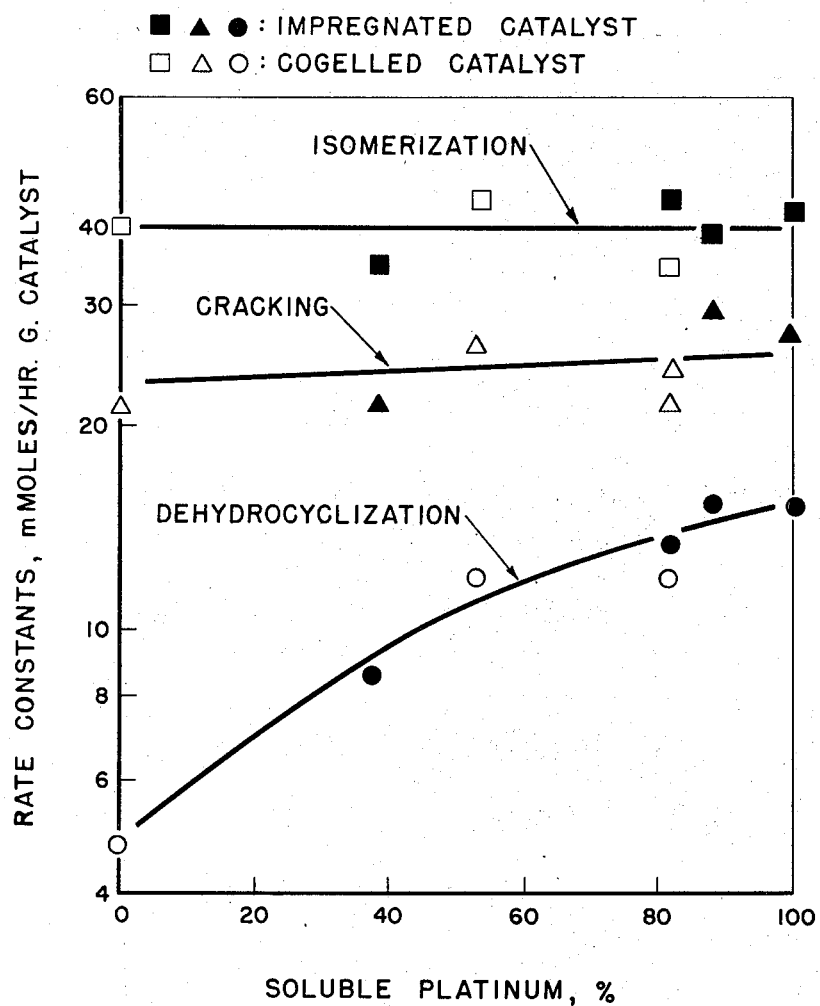

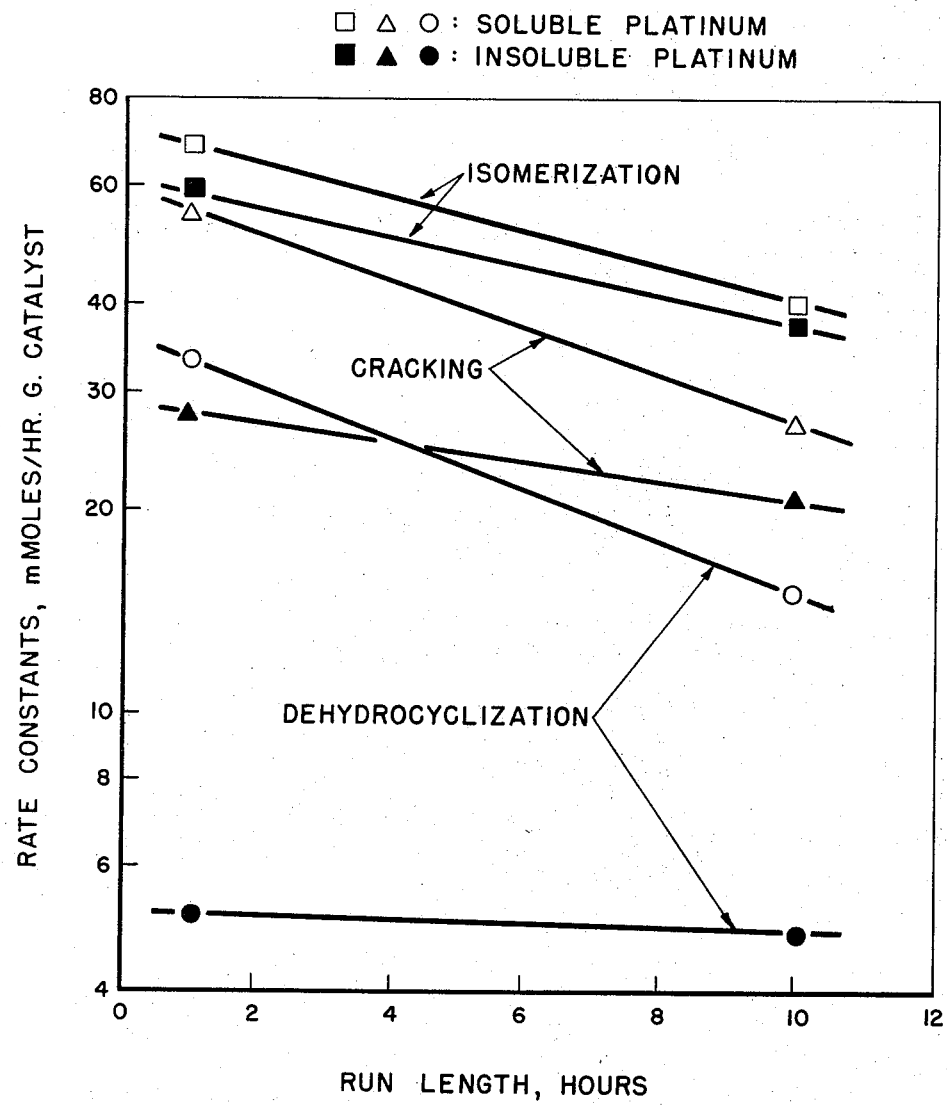

3,375,190
SOLUBLE PLATINUM CONTENT OF FIRST REACTOR BELOW 40% AND SUBSEQUENT REACTOR ABOVE 40%
Keith W. McHenry, Jr., Park Forest, Ill., Harry M. Brennan, Hammond, Ind., and Edmond L. d'Ouville, La Grange, Ill., assignors to Standard Oil Company, Chicago, Ill., a corporation of Indiana
Continuation-in-part of application Ser. No. 41,336, July 7, 1960. This application Dec. 27, 1963, Ser. No. 333,815
3 Claims. (Cl. 208—65)

This application is a continuation-in-part of our copending application Serial Number 41,336 filed July 7, 1960, now abandoned, which application is incorporated herein by reference and made a part hereof.

This invention relates to an improved regenerative platinum-on-alumina hydrocarbon conversion system for reforming naphthas. More specifically, the invention relates to an improvement in reforming paraffinic naphthas, e.g., naphthas with more than about 40 percent paraffins and boiling in the $C_5$–400° F. boiling range.

Production of high-octane-number gasoline by catalytic reforming with platinum-on-alumina catalysts is a major petroleum-refining process. The low-octane-number charge to the process is primarily a mixture of paraffinic and cycloparaffinic molecules, although some aromatic molecules also are usually present. Desirable reaction that produce high-octane-number aromatic and isoparaffinic products are dehydrocyclization, dehydrogenation, and isomerization. Cracking to lower-molecular-weight products that still boil in the gasoline fraction also slightly increases octane number. The principal degradative reaction is cracking to produce gaseous products. In addition, a small percentage of the charge is converted to a carbonaceous deposit on the catalyst.

The contribution of each reaction to octane number varies. Dehydrocyclization of paraffins to produce aromatics is the slowest of the reforming reactions, and it determines the yield of high octane number reformate. Low octane paraffins must be minimized in the product if maximum octane is to be achieved. Removal of low octane paraffins by increasing cracking produces high octane product, but at a sacrifice of yield. Isomerization and dehydrogenation of cycloparaffins to aromatics, and isomerization and cracking of paraffins and cycloparaffins are faster reactions than dehydrocyclization and require smaller amounts of catalyst.

The platinum-alumina catalysts to which our invention pertains usually comprise about .01 to 2 weight percent platinum and about .05 to 5 weight percent chloride, supported on some form of alumina-containing base, usually a gamma, eta, theta, and/or chi-type alumina (see "Alumina Properties," Technical Paper No. 1, revised by Russell et al., copyright 1956, Aluminum Company of America). Preparation of such composites is described, for example, in Heard et al. U.S. 2,659,701.

Hydrocarbon conversion activity of such composites, however, is not a mere direct function of the platinum and/or halogen content. It has previously been found that the activity of a given platinum-halogen-alumina composite varies with the amount of hydrofluoric acid-soluble platinum contained therein. By the term soluble platinum content, as used, herein, is meant the portion of the total amount of platinum in a catalyst composite which is in a form which is dissolved by the hereinafter processes in either hydrofluoric acid (HF) or acetylacetone, expressed in weight percent. The proportion of soluble platinum may be determined by contacting such a composite with an excess of hydrofluoric acid (or acelyacetone) so as to react, dissolve or otherwise bring into solution substantially completely all of the aluminia in the composite. The platinum which also appears in the resulting solution, hereinafter referred to as soluble platinum, can be directly related to hydroforming activity of the catalyst, as described in Bertolacini U.S. 2,928,792.

The activity of a catalyst is defined as the relative quantity of that catalyst, expressed as a percentage, required to produce a $C_5+$ reformate fraction having the same octane rating as that produced from the same feed by an arbitrarily chosen reference catalyst under the same test conditions. This is the method of expressing reforming catalyst activity commonly used in the petroleum industry.

It will be noted that catalyst activity, which was correlated with soluble platinum content by Bertolacini, has no bearing on reformate yield. Thus the reformate from different catalysts having equal activity will have equal octane ratings when produced under the same operating conditions; however, the reformate yield may be markedly different. The term used to denote relative yield is selectivity. Aromatics have high octane ratings and thus are desirable compounds in reformate. Most paraffins have relatively low octane ratings and are undesirable.

Aromatics are produced during naphtha reforming in two ways: dehydrogenation of naphthenes and dehydrocyclization of paraffins. The first reaction is easy and rapid, the latter difficult and slow. Paraffins are eliminated during reforming principally by cracking to produce light hydrocarbons (butane and lighter) and dehydrocyclization to produce aromatics. Reformate octane is increased by each of these paraffin-removing reactions; however, at constant reformate octane, increased cracking reduces yield, while increased dehydrocyclization increases yield. Naphthenes are also quite susceptible to cracking, which, if not avoided, results in significant loss of aromizes dehydrocyclization and minimizes cracking is much in demand.

We have discovered that the paraffin dehydrocyclization reaction is most effectively carried out in a regenerative process over a catalyst containing a maximum of the platinum present in a complex form wherein the platinum has a valence of plus four. In this form the platinum is soluble in HF or acetylacetone. This solubility provides a convenient means for determining the amount of plusfour valence platinum in the catalyst. We have also discovered that the dehydrogenation of naphthenes reaction is most selectively carried out over a catalyst containing a low percentage of platinum in the plus-four valence state. The naphthene cracking rate is lower with low plusfour valence platinum content. However, the highly oxidized plus-four valance form of platinum is relatively unstable under reforming conditions and is lost as the oil cycle proceeds. We therefore provide a reforming process wherein added over-all activity and selectivity are simultaneously obtained by maintaining the plus-four valence platinum content of the catalyst high in the final stage(s) to maximize dehydrocyclization, and low in the initial stage(s) to minimize cracking of naphthenes therein.

Since it is difficult to maintain the platinum component of the catalyst in the plus-four valence state, for fixedbed operation we provide a reactor system including a plurality of series reactors in which the final reactors are on a very short on-oil cycle length with frequent offstream oxidation of the catalyst. For the fixed-bed system the oil cycle length for the tail reactor or reactors is from 0.1 to 12 hours with normal reforming conditions. Thus, the cycle length of the tail reactor or reactors is adjusted so that the soluble, plus-four valence platinum content of the catalyst is maintained greater than 40 percent, and preferably greater than 50 percent, during the entire length of the on-oil cycle. The catalyst in the initial stage(s) is maintained in the insoluble form during most of the on-oil cycle to minimize cracking of the naphthenes.

The plus-four valence soluble platinum is believed to be a chemical complex of platinum, alumina and chloride. Neither the exact composition nor the structure of the complex is known. However, the platinum may be conveniently converted to the plus-four valence state, and restored to this plus-four complex form following a period of on-oil time, by treatment of the catalyst with oxygen-containing gas at a temperature in the range of about 700–1400° F. A convenient oxygen-containing gas for effecting regeneration is flue-gas containing controlled amounts of air. Oxygen content is normally controlled in the range of about 1–5 percent for safety, although undiluted air may be used following coke removal from the catalyst at lower oxygen content. Any coke deposits present on the catalyst are simultaneously removed by this oxidative regeneration. Preferred regeneration temperatures fall in the range of about 750–1050° F. Regeneration is preferably carried out under pressure to reduce the time required. Pressures in the range of about 100–500 p.s.i. are normally employed.

Chloride in the catalyst facilitates conversion of platinum to the plus-four valence complex form during oxidative regeneration of the catalyst. Only about 65 percent of the platinum in a chloride-free platinum-impregnated catalyst (0.6 wt. percent platinum) can be converted to the soluble form by extensive high temperature air treatment. At a chloride:platinum atom ratio of 2:1, essentially all the platinum may be converted to soluble form. The preferred chloride:platinum atom ratio is 6:1 to reduce the time required. Higher ratios have no effect on soluble platinum formation.

Our improved process as applied to fixed bed operations may employ an initial reforming stage of one or more reactors in series with a subsequent stage including 3 or more fixed bed tail reactors in parallel, more than one of said tail reactors undergoing regeneration at the same time. The same objective may be achieved by using a fluidized or moving bed tail reactor assembly as the subsequent stage, a portion of the catalyst being continuously regenerated in a fluidized or moving bed regenerator. In either event, the on-oil time for the catalyst is selected so as to assure the high level of plus-four valence soluble platinum.

A particularly beneficial application of the present invention is a multi-stage reforming process wherein the soluble platinum content of the catalyst in the first stage is maintained below about 40%, preferably below about 25%, to minimize cracking of the valuable naphthenes during their dehydrogeneration in this stage, and maintaining the soluble platinum content of the catalyst in a subsequent stage above about 40%, preferably above about 65%, to enhance the dehydrocyclization of paraffins to aromatics. In a properly balanced reaction system, i.e. wherein the quantities of catalyst are sufficient, two stages may be used and operated in the above manner so that essentially all of the naphthenes in the feed are converted to aromatics in the first stage. Loss to cracked products at the higher severity in the second stage is minimized and over-all aromatics production is maximized.

In fluidized and moving bed systems having suitably short on-oil time between regenerations the soluble platinum content may be monitored by sampling the catalyst and analyzing for soluble platinum content in the circulating catalyst to provide a guide for maintaining the plus-four valence platinum content at the desired amount. For fixed-bed units control of soluble platinum may be based on tests at equivalent conditions in small scale units from which catalyst samples can be conveniently removed.

Our invention and discovery will be described hereinafter in greater detail and reference will be made from time to time to the accompanying drawings wherein:

FIGURE 2 shows the effect of soluble platinum on rate constants;

FIGURE 3 shows the effect of run length on the rate constants for reactions during reforming.

ILLUSTRATIONS

Figure 1:
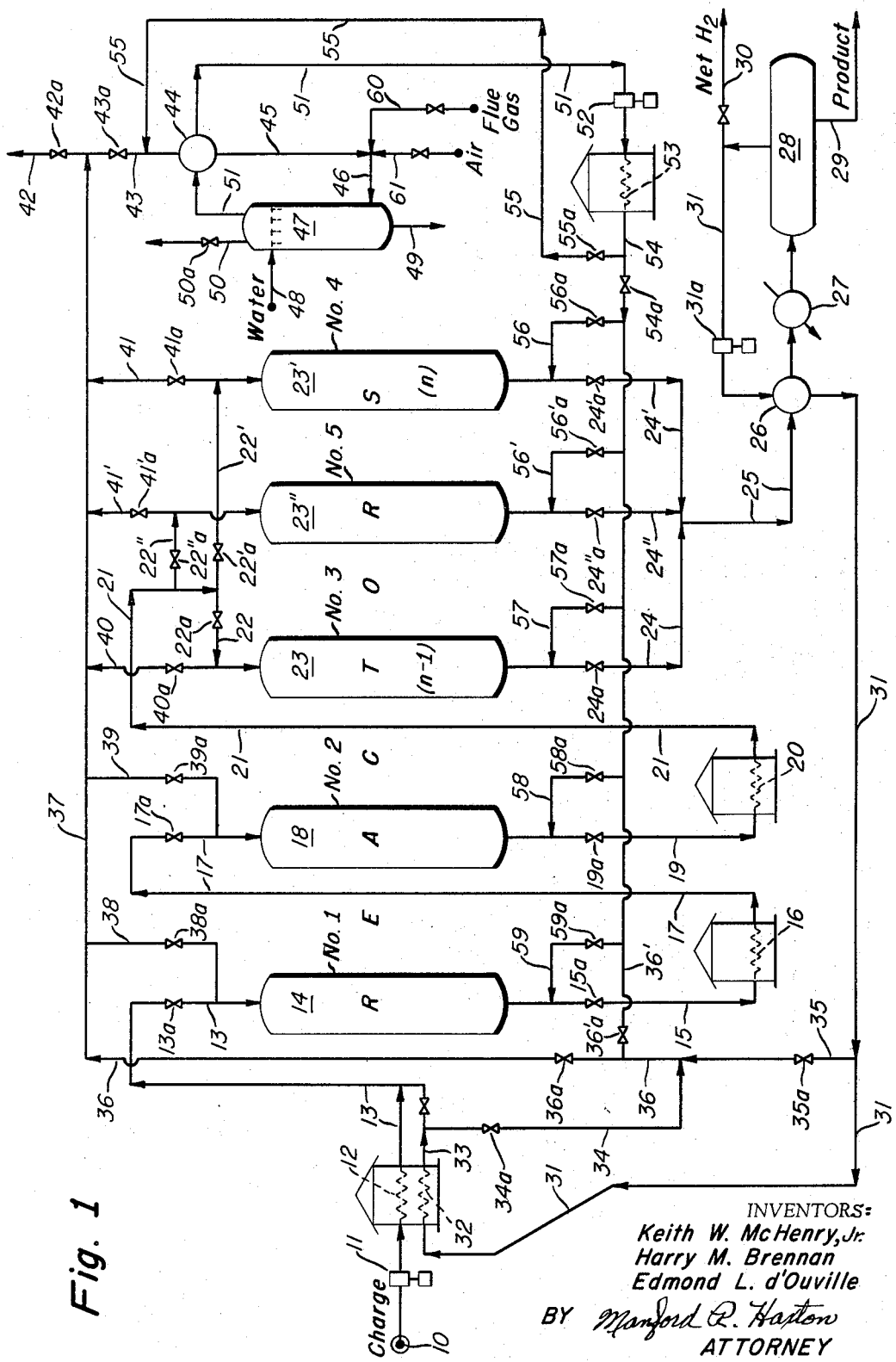
FIGURE 1 is a schematic flow sheet illustrating one embodiment of a process in accordance with our invention.

To determine the nature of the most effective catalyst for the dehydrocyclization of paraffins such as n-heptane, reforming experiments were carried out with catalysts with various types of catalytic sites. In addition to the rate of n-heptane dehydrocyclization, cracking and isomerization rates were also measured.

Platinum-on-alumina catalysts that are most effective for the dehydrocyclization of paraffins such as n-heptane contain platinum in a plus-four valence form which can be dissolved by either a dilute solution of HF or with acetylacetone. These plus-four valence platinum catalysts are more active than dual-functional catalysts having separate metal and acid sites.

The amount of platinum which is soluble in dilute hydrofluoric acid can be determined by adding a 25 percent HF solution to ground catalyst. This reaction can be cooled in ice. The alumina and the soluble portion of the platinum dissolve leaving a black residue. The residue is removed by filtration (Whatman Paper No. 42) and analyzed for platinum. Platinum analyses of both soluble and insoluble portions can be obtained as a check. If the catalyst contains coke, the insoluble residue is washed with 6 N HCl to remove soluble platinum adsorbed on it. Experiments have shown that the HCl extraction removes all the soluble platinum and dissolves none of the HF-insoluble platinum.

Platinum which is soluble in acetylacetone can be determined by refluxing ground catalyst samples with acetylacetone for six hours. The residue is then filtered, washed with hot benzene, and analyzed for platinum. The soluble portion is determined by difference.

The soluble platinum is probably neither the platinum oxides alone nor finely divided platinum. This platinum having a valence of plus four is believed to be present as a complex formed by the reaction of chloroplatinic acid and the alumina used as the support. The complex is readily reduced by formic acid, and very slowly by hydrogen. After a 10-hour dehydrocyclization experiment at 490° C. and 19.7 atmospheres of hydrogen, about 40 percent of the platinum still exists as the complex.

When the soluble platinum content of a reforming catalyst is at a maximum, then the rate constant for dehydrocyclization is also maximized as shown by the following table:

|  | Rate Constant | |
| --- | --- | --- |
|  | Dehydrocyclization | Cracking |
| Soluble Platinum, percent of Total Pt: | | |
| 0 | 4.8 | 21 |
| 53 | 11.6 | 25 |
| 100 | 15.4 | 27 |

These data were obtained using 0.6% Pt, 0.6% Cl catalyst at 275 p.s.i.g., 5000 s.c.f./b. once through $H_2$, 1.4 WHSV, 910° F., in a pseudo-isothermal reactor. Soluble platinum content is at the start of a 10-hour run. The rate constants are given in millimoles/hr./g. catalyst. It will be noted that the cracking rate constant is relatively insensitive to soluble platinum content so that selectivity as well as activity increases with increasing soluble platinum.

Since dehydrocyclization is the most important reaction in the last (or last two) reactors of a multi-reactor reformer, the plus-four valence soluble platinum should be kept near maximum in these reactors. In our process this is done by relatively frequent oxdiation of the catalyst under normal regeneration conditions. This oxidation is carried out much more frequently than would be required merely for removing coke from the catalyst.

That soluble platinum is not stable to reforming conditions is shown in the following table:

| | Soluble platinum content, percent |
|---|---|
| Start | 100 |
| End of 1 hour reforming run | 54 |
| End of 10 hour reforming run | 37 |

The plus-four valence soluble form of platinum can be completely restored by regeneration. Thus, by keeping tail reactor oil cycles between oxidations short, preferably less than 10 hours, plus-four valence soluble platinum is maximized.

The effect of hydrogen treatment on the soluble-platinum content and thus on the dehydrocyclization rate of platinum-alumina-chloride catalysts is given in Table I.

TABLE I.—DEHYDROCYCLIZATION RATE AND SOLUBLE PLATINUM

| Hydrogen Treatment | Soluble Platinum, percent | | Dehydrocyclization Rate Constant |
|---|---|---|---|
| | HF | Acetylacetone | |
| None (air) | 100 | 100 | 15 |
| 1 atm., 950° F., 6 hrs | 53 | 56 | 12 |
| 1 atm., 1,290° F., 16 hrs | 0 | 0 | 4.8 |

A decrease in the percentage of the plus-four valence platinum which is soluble in either HF or acetylacetone decreases the dehydrocyclization rate drastically.

The relationships between plus-four valence soluble platinum and the rate of dehydrocyclization, cracking, and isomerization for cogelled and impregnated catalysts are shown in FIGURE 2. The soluble platinum content was varied by treatment with hydrogen or air. Inasmuch as the two types of catalyst employed (impregnated or cogelled) give identical results, method of catalyst preparation is not significant. Dehydrocyclization rate increases markedly with increasing plus-four valence soluble platinum, whereas cracking and isomerization are essentially unchanged. Significantly, the ratio of dehydrocyclization to cracking was increased from about 0.2 to 0.5 by converting the platinum from the insoluble to the plus-four valence form. Thus, the most efficient platinum-alumina-chloride catalyst for maximizing dehydrocyclization and thus product yield during naphtha reforming contains a unique form of platinum.

The plus-four valence soluble platinum is not a platinum oxide or a finely divided platinum, but is believed to be a chemical complex of platinum, alumina and chloride. A sample of pure $PtO_2$ was soluble to the extent of only 0.003 percent. A mixture of $PtO_2$-PtO-Pt prepared by oxidation of platinum black was insoluble in dilute HF. These experiments show the insolubility of platinum oxides.

Neither the exact composition nor the structure of the complex is known. Platinum in the plus-four valence state is probably combined with the alumina lattice. The platinum-alumina complex probably contains either chloride or hydroxy groups or both.

Chloride in the catalyst facilitates the conversion of platinum to the complex form during oxidative regeneration of the catalyst. Impregnated and cogelled catalysts were steamed free of chloride and all the platinum was converted to the insoluble form by treatment with hydrogen at 1290° F. Chloride, as aluminum chloride, was added back in various amounts to aliquots of these catalysts. The rechlorided catalysts were treated with air, and the amount of soluble platinum was determined.

About 65 percent of the platinum in a chloride-free impregnated catalyst can be converted to the soluble form by the air treatment. At a chloride:platinum atom ratio as low as 2:1, essentially all the platinum in this catalyst is converted to the soluble form. When a cogelled catalyst with a 1.5:1 chloride:platinum ratio was given a two-hour air treatment only 35 percent of the platinum was soluble. A second portion of this catalyst was given a 16-hour air treament and the soluble platinum increased to 90 percent, the same level found for the impregnated catalyst. Conversion of the platinum in a cogelled catalyst to the soluble form is slower, probably because the platinum aggregates are larger.

The stability of the complex has been measured in the presence of hydrogen and under reforming conditions where both hydrogen and hydrocarbons are present. Catalyst having three different chloride contents were treated with hydrogen at 21.4 atmospheres for 16 hours at typical reforming temperatures:

| Temperature | 905° F. | | | 970° F. | | |
|---|---|---|---|---|---|---|
| Chloride Content | 0.0 | 0.6 | 0.9 | 0.0 | 0.6 | 0.9 |
| Soluble Platinum, percent | 4 | 47 | 42 | 9 | 39 | 40 |

Above 0.6 percent, chloride has no effect on the stability of the complex.

In reforming experiments with catalysts containing all the platinum in the soluble form, about 55 percent was still soluble after one hour, and about 35 percent after ten hours. Although decomposition of complex occurs at reforming conditions, an appreciable amount remains even after ten hours. Decreases in soluble platinum are accompanied by decreases in rate constants as is shown in FIGURE 3.

Our studies show that isomerization and cracking rates can not be used to evaluate a reforming catalyst; dehydrocyclization rate must be measured if the catalyst is to be adequately characterized. They also show that the reaction mechanism may change if the active component—the complex in the case of the dehydrocyclization reaction—is unstable under the conditions of the experiment.

The relationship between the platinum-alumina-chloride complex and dehydrocyclization activity has important implications on the commercial use of platinum reforming-catalysts. The complex is not stable at reforming conditions for long periods, but frequent oxidative regeneration with air will maintain a high level of soluble platinum and minimize the effects of coke. This results in higher dehydrocyclization rates, and hence higher octane numbers and higher yields.

The invention will be more clearly understood from the following description of a specific example read in conjunction with the accompanying drawing, FIGURE 1, which forms a part of the specification and which is a schematic flow diagram of the improved hydroforming system.

The naphtha charge in this example is a virgin Mid-Continent naphtha having a boiling range of about 200 to 360° F., containing about 50 percent paraffins, 42 percent naphthenes and 8 percent aromatics, having a research octane number of about 45 and being substantially free from sulfur and nitrogen compounds, the sulfur content being preferably not more than .01 percent and the nitrogen content not more than 1 or 2 parts per million. In order to remove sulfur, nitrogen and other deleterious components from the charging stock, it may be pretreated, for example, by hydrodesulfurization with a platinum-on-alumina catalyst or with a so-called sulfur-immune catalyst containing an oxide or sulfide of a group VI metal such as molybdenum or tungsten combined with an oxide or sulfide of a group VIII metal such as nickel or cobalt on an alumina support. The hydrodesulfurization conditions should be selected to effect removal of nitrogen as well as sulfur. The charge is preferably stripped and/or fractionated after the preliminary hydrodesulfurization step as described in greater detail in U.S. Patent 2,800,428.

Referring to the drawings, the naphtha charge from source 10 is pumped by pump 11 to a pressure of about 300 p.s.i.g. and passed through preheater coil 12 wherein it is vaporized and heated to about 900° F. and then introduced through line 13 to reactor 14 together with about 4,000 to 8,000 cubic feet per barrel of hot recycled hydrogen so that the inlet temperature to reactor 14 is in the range of about 900 to 950° F., the temperature being in the lower part of this range at the beginning of the operation and being raised as the operation proceeds. For a plant processing about 10,000 barrels per day of charge, reactor 14 may contain about 10 to 12 tons (about 400 to 500 cubic feet) of platinum-on-alumina catalyst in the form of ⅛-inch diameter pellets. Such catalyst may be prepared as described in U.S. 2,659,701 or by any other method known to those skilled in the art and, since no novelty is claimed in the catalyst per se, it will not be described in further detail. The catalyst should contain a small amount of chlorine to facilitate formation of the soluble complex but it should be substantially free from sodium, iron, and molybdenum.

The conversion in reactor 14 is highly endothermic and the average temperature in the catalyst bed in this first reactor is in the range of 800 to 875° F. Initially the effluent temperature may be as low as 750° F. but during continued operation the effluent temperature increases to about 800° F. and even to 850° F. This effluent is passed by line 15 to reheater 16 wherein it is reheated to a temperature in the range of about 900 to 950° F. and introduced by line 17 to reactor 18 which may contain approximately the same amount of the same type of catalyst as is employed in reactor 14. In this system, however, it is possible to employ different amounts of catalyst in reactors 14 and 18; reactor 14 may contain only 8 tons and reactor 18 may contain 12 tons of the defined catalyst. The average temperature in the catalyst bed in reactor 18 is usually above 850 and below 900° F., the effluent leaving this reactor at a temperature of at least about 825 but below 900° F., the temperature usually increasing within this range as the run proceeds.

Effluent from reactor 18 is passed by line 19 to reheater 20 wherein it is heated to a temperature in the range of about 920 to 980° F. and then passed by line 21 and lines 22 and 22′ to reactors 23 and 23′ which are connected to operate in parallel. In a four reactor system these reactors are referred to as the final or tail reactors. It should be understood that an additional number of reactors may be employed, each preceded by a preheating step, use of additional reactors being desirable in systems for producing 97 to 100 octane number product. In this example reactors 23, 23′ and 23″ each contain the same amount of the same type of catalyst which is contained in reactor 14. At the beginning of an on-stream period charge may be introduced into these tail reactors at a temperature of about 920° F. but as the run proceeds the inlet temperature is raised. The average catalyst bed temperature in the tail reactors is in the range of 900 to 950° F. and the effluent from the tail reactors at a temperature of at least about 900° F. is withdrawn through lines 24, 24′ and 24″, line 25, heat exchanger 26 and cooler 27 to separator 28 wherein hydrogen is separated from condensed hydrocarbons at a temperature not substantially higher than about 100° F.

The condensed hydrocarbons are withdrawn through line 29 to any known type of product recovery system; in this example the product will require depropanizing and, if desired, debutanizing but will not require rerunning. The net hydrogen produced is withdrawn through line 30 usually to a suitable absorber for recovering hydrocarbons therefrom. The remainder of the hydrogen is recycled by compressor 31a through line 31 and heat exchanger 26, most of the hydrogen passing through heating coil 32 and lines 33 for admixture with charging stock vapors in transfer line 13.

A part of the heated hydrogen may be withdrawn through line 34 in amounts controlled by valve 34a for admixture with another part of the recycled hydrogen withdrawn from line 35 in amounts controlled by valve 35a. This hydrogen mixture may be passed by line 36 which communicates with line 37 to any selected reactor by branch lines 38, 39, 40, 21 and 41′. Line 37 also serves as a regeneration gas line from which gases may be vented to a stack by line 42 in amounts controlled by valve 42a. By closing valve 42a and opening valve 43a regeneration gases may be circulated by line 43 through heat exchanger 44, line 45 and line 46 to the base of scrubber 47 wherein the gas is cooled and scrubbed by water or alkaline aqueous medium introduced through line 48 and withdrawn through line 49. Excess gas may be vented from the top of scrubber 47 through line 50 in amounts controlled by valve 50a. Cooled gas from the top of scrubber 47 may be passed by line 51 through heat exchanger 44 and then compressed by compressor 52 and heated to the desired temperature in heater 53 for return through line 54. A by-pass line 55 containing valve 55a provides for recycling heated gas to scrubber 47. Line 54 communicates with each of the reactors through lines 56, 57, 58 and 59, respectively.

After the on-stream operation above described has been in progress for a time sufficient to reduce the dehydrocyclization activity of the catalyst as evidenced by the loss in conversion of paraffins and/or by the reduction of the soluble platinum content of the catalyst to about 40 to 50 weight percent of the total platinum on the catalyst it is desirable to regenerate the catalyst in the reactor in question. Ordinarily, the diminution of soluble platinum and/or the dehydrocyclization activity occurs from about 0.1 to 10 hours on-oil cycle.

At this time valve 22a is closed and the reactor contents are purged from the reactor by introducing hydrogen from lines 36 and 37 through line 40 by opening valve 40a. When reactor 23 is thus taken off-stream by closing valve 22a it is preferred to increase the reheat temperature of the inlet stream to reactor 43′ by at least about 10° F., e.g. to about 975° F., in order to avoid undue octane number decline in the final effluent. After hydrocarbons have been purged from reactor 23 with hydrogen introduced through line 40, valves 34a and 35a are closed and valve 42a is set to depressure the reactor and vent the hydrogen to a stack, valves 24a and 43a being closed. Meanwhile, flue gas produced in an external source (not shown) is introduced by line 60 and line 46 and is being circulated by line 51 to compressor 52 and heater 53 and thence back by line 55. When reactor 23 has been depressured, valves 54a and 57a are opened and valve 55a is closed so that the flue gas passes upwardly through reactor 23 for purging hydrogen therefrom. After the flue gas purge of the hydrogen is complete valve 42a is closed, valve 43a is opened and the pressure in reactor 23 is gradually raised to about 200 to 300 p.s.i.g. by continued introduction of flue gas with heater 53 discharging at a temperature of about 700° F. When the desired regeneration pressure has been reached, the introduction of flue gas through line 60 is discontinued and air is introduced through line 61 to give about a 1 percent oxygen concentration in the circulating flue gas entering the reactor which effects combustion of carbonaceous deposits on the catalyst in a combustion zone which traverses the catalyst bed in reactor 23. The amount of oxygen is controlled to prevent the bed temperature from exceeding about 1050° F. The net flue gas produced by the combustion is vented from the system through line 50 and valve 50a which may now be set to hold the desired back pressure.

When the catalyst is completely regenerated by burning combustible deposits thereon, the introduction of air is continued through line 61 but heater 53 is set to heat the recycled gas to a temperature of about 1050° F. and the catalyst is thus given a treatment with a gas having a high oxygen partial pressure for effecting rejuvenation. Chlorine or chloride affording substances may be added via the reactor inlet line to adjust the chloride content of the catalyst to near the optimum level of about 1:1 weight ratio (6:1 atom ratio) chloride to platinum. Thereafter the introduction of air is discontinued, valve 50a is set for pressure reduction and the oxygen-containing gas is purged from the system through line 50. To complete this purge, flue gas is again introduced through line 60, valve 42a is opened and 43a is closed and all oxygen is removed from the system by flue gas. Valve 54a is closed and hydrogen is introduced at the base of the reactor by opening valve 36'a (valve 36a being closed), line 36' and line 57. The temperature of the hydrogen thus introduced by line 36' is controlled by regulating valves 34a and 35a. As soon as all of the flue gas has been eliminated from the reactor system through lines 40, 37 and 42, valve 42a is set for repressuring to required on-stream pressure; during this period valve 36a may be opened and valves 36'a and 57a may be closed and when the reactor reaches the desired pressure, valve 24a may be opened, valves 36a and 40a closed and inlet charging stock stream is reintroduced by opening valve 22a.

When reactor 23 is returned on-stream (with an inlet temperature of about 920° F.) the catalyst in reactors 23' and 23" may be regenerated and rejuvenated in a similar manner. Such regeneration and rejuvenation may only require about 4 to 24 hours and when reactor 23' or 23" is again placed on-stream, the tail reactors may be operated in parallel until the amount of the platinum in soluble form in one of them has decreased to about 40%. Obviously, the amount of stream introduced through line 21 may be introduced into reactors 23, 23' and 23" in any desired proportions by controlling valves 22a, 22'a and 22"a. The inlet temperature of the stream entering the tail reactors may be increased from about 920 to 960° F. to maintain the desired octane number and, after a period of parallel operation, it is desirable to further increase the inlet temperature by at least about 10° F. in the single reactor which is on-stream while the other rail reactors are undergoing regeneration.

By employing the conditions in the earlier reactors hereinabove set forth, these reactors may be operated for from 1 to 24 months without requiring regeneration. By that time it is usually desirable to shut down the entire plant for inspection and repair and the catalyst in reactors 14 and 18 can be regenerated while the plant is thus shut down, using the same sequence of operations described above for reactor 23. The plant and operation herein described requires a much lower capital investment than the hydroforming system wherein an alternate reactor is connected to be operated in parallel with each and all of the reactors in the system. Still further savings in capital investment may be effected by limtiing the regeneration to the tail reactors and replacing the catalyst in the first two reactors during the shut-down period. At the same time the advantages of Ultraforming are obtained, i.e., the increased yields of high octane number motor fuel in the range of 93 to 100 octane number, better utilization of catalyst activity and greater flexibility than could possibly be obtained with a non-regenerative system. While maximum advantages are obtainable by operations with on-stream pressures in the range of 100 to 350 p.s.i.g., the apparatus and process features herein described may likewise be used in systems wherein the on-stream pressures are substantially higher, i.e., 400 to 750 p.s.i.g. or more, at least in the stages preceding the tail reactors.

Although the invention has been described by reference to an embodiment whereby fixed bed catalyst reaction zones are employed, it is contemplated that the tail or swing reactors which comprise the second stage of our reforming process, may be replaced by a fluidized bed system or by a moving bed system.

Typically, a fluidized bed system includes a pair of contactors with on-stream contacting taking place in one and regeneration in the other. The catalyst is transferred between the contactors by techniques which are well known in the art. In such a system the catalyst is maintained in a dense turbulent suspended phase in the lower portion in each of the contactors with draw-off of the dense phase between the contactors in a selected cycle. Means are provided for introducing the hydrocarbon charge to one contactor and for introducing oxygen-containing regeneration gas into the other, i.e., regenerator. Cyclones or other means may be provided for removing suspended catalyst from the effluent from each of the contactors.

An alternative disposition of the catalyst involves the employment of so-called moving bed reactors. These reactors or systems employ catalyst in the form of pellets of about 1/8 to 3/8" in diameter, with pellets continuously being transferred from one or more contacting zones to one or more regeneration zones. When using a moving bed system it is advantageous to pass the process stream of petroleum hydrocarbons and hydrogen upward through the descending bed of catalyst. Processing and regeneration conditions having moving beds are similar to those for either fixed or fluidized bed systems.

It is contemplated that one or the other of the above systems may be substituted for reactors 23, 23' and 23" in the flow diagram comprising FIGURE 1 of the drawings. The naphtha charge from line 21 may be supplied to the reactor system and air and flue gas introduced by lines 61 and 60 may be furnished via line 51 and furnace 53 and line 54 to the regenerator of the alternative system.

In accordance with our invention the constitution of the catalyst, the conditions of the reforming operation, and the periodic restoration of the transient soluble platinum complex are correlated to provide maximum reformed product from naphthas of high paraffin content. The platinum-alumina catalyst is maintained at temperatures in the range of about 800 to 1050° F. and pressures are maintained at below about 400 p.s.i.

Preferably, water is removed from the system so as to maintain the total water content in the effluent stream from the final reactor below about 100 p.p.m. by weight based on naphtha feed. The naphtha feed is desulfurized and the reforming operation is conducted at high severity in the final reactors and it is in these reactors that dehydrocyclization of paraffins is effected. In this connection the final reactors are beneficially operated at high severities of at least about 90 octane number Research clear in the presence of plus-four valence soluble platinum, at least 40 weight percent, with more than about 65 weight percent soluble platinum being particularly effective in increasing the rate of dehydrocyclization under the low pressure, dry, high severity reforming conditions which effect the dehydrocyclization of paraffins.

By maintaining the soluble platinum content above about 40 weight percent the frequent regenerations disclosed herein will periodically restore the optimum dehydrocyclization activity of the platinum-catalyst by increasing the soluble platinum content. It is contemplated, however, that from time-to-time we may rejuvenate the catalyst by employing more severe regeneration conditions of higher temperature and/or higher oxygen concentration as described above. Ordinarily, such rejuvenation will be undertaken only in those circumstances where the soluble platinum content has been reduced to a lower value than about 40 weight percent as described herein.

In accordance with our process, petroleum hydrocarbons which contain substantial quantities of dehydrocyclizable components are hydroformed in the presence of hydrogen gas and a platinum-alumina-chlorine catalyst wherein the soluble platinum content is maintained in the range of not less than about 40 weight percent to about 100 weight percent of the total platinum during the hydroforming.

The desired catalyst composition in the dehydrocyclization stage will result from the alternate on-steam and regeneration cycles of the process. However, it is contemplated that a catalyst may be prepared for dehydrocyclization of paraffins by sequential and alternate pretreating of the platinum-alumina catalyst with nonoxidizing gases and oxygen-containing gases under conditions conductive to the build up of soluble platinum.

The total naphtha charge is hydroformed in an initial stage under conditions wherein the soluble platinum content of the catalyst may be substantially less than about 40 weight percent, such initial stage producing petroleum hydrocarbons which predominate in aromatics and dehydrocyclizable components comprising $C_6$ paraffins. The super active or severe catalyst having a high soluble platinum content is used in a subsequent stage which, as outlined above, may comprise a plurality of parallel superactive catalyst zones. It is contemplated that at least two of such parallel zones may be undergoing regeneration while at least one other zone in said subsequent stage is on-stream.

We claim:

1. A process for hydroforming desulfurized petroleum hydrocarbons in the presence of hydrogen gas, which process comprises passing said hydrocarbons and hydrogen gas into an initial hydroforming stage containing a first quantity of platinum-alumina-chloride reforming catalyst under hydroforming conditions, said platinum-alumina-chloride catalyst comprising 0.01 to 2.0 weight percent platinum, 0.05 to 5.0 weight percent chlorine, and an alumina-containing base, said first quantity of catalyst having a soluble platinum content of less than about 40 weight percent, withdrawing a stream of hydrocarbons and hydrogen from said initial stage and passing said stream to at least one subsequent hydroforming stage, said subsequent stage containing a second quantity of platinum-alumina-chloride reforming catalyst, said platinum being in the plus-four valence state, effecting additional hydroforming in said subsequent hydroforming stage under processing conditions favoring the dehydrocyclization of paraffins to aromatics, maintaining in the catalyst of said subsequent stage a plus-four valence platinum content of at least 40 weight percent by periodically discontinuing hydroforming over at least a portion of catalyst in said subsequent stage and contacting said catalyst with an oxygen-containing gas to restore the soluble platinum content to a substantially high level, and recovering the thus hydroformed petroleum hydrocarbons.

2. A process for hydroforming desulfurized petroleum hydrocarbons in the presence of hydrogen gas, which process comprises passing said hydrocarbons and hydrogen gas into an initial hydroforming stage containing a first quantity of platinum-alumina-chloride reforming catalyst under hydroforming conditions, the atom ratio of chlorine to platinum in said catalyst being in the range of about 1.5:1 to 10:1, said first quantity of catalyst having a soluble platinum content of less than about 40 weight percent, withdrawing a stream of hydrocarbons and hydrogen from said initial stage and passing said stream to at least one subsequent hydroforming stage, said subsequent stage containing a second quantity of platinum-alumina-chloride reforming catalyst, said platinum being in the plus-four valence state, effecting additional hydroforming in said subsequent hydroforming stage under processing conditions favoring the dehydrocyclization of paraffins to aromatics, maintaining in the catalyst of said subsequent stage a plus-four valence platinum content of at least 40 weight percent by periodically discontinuing hydroforming over at least a portion of catalyst in said subsequent stage and contacting said catalyst with an oxygen-containing gas to restore the soluble platinum content to a substantially high level, and recovering the thus hydroformed petroleum hydrocarbons.

3. The process of claim 2 wherein said ratio is maintained by off-stream addition to the catalyst of a material selected from the class consisting of chlorine and chlorine affording substances.

References Cited

UNITED STATES PATENTS

| | | | |
|---|---|---|---|
| 2,928,792 | 3/1960 | Bertolacini | 252—466 |
| 3,024,186 | 3/1962 | Newby et al. | 208—65 |
| 3,117,073 | 1/1964 | Hertwig et al. | 208—65 |

HERBERT LEVINE, *Primary Examiner.*

DELBERT E. GANTZ, *Examiner.*

UNITED STATES PATENT OFFICE
CERTIFICATE OF CORRECTION

Patent No. 3,375,190                            March 26, 1968

Keith W. McHenry, Jr., et al.

It is certified that error appears in the above identified patent and that said Letters Patent are hereby corrected as shown below:

Column 1, line 28, "reaction" should read -- reactions --; line 66, after "hereinafter" insert -- described --. Column 2, line 1, "aluminia" should read -- alumina --; line 9, "arbitraily" should read -- arbitrarily --; line 36, "mizes" should read -- matics production. Thus a reforming process which maximizes --.

Signed and sealed this 13th day of January 1970.

(SEAL)
Attest:

Edward M. Fletcher, Jr.                       WILLIAM E. SCHUYLER, JR.
Attesting Officer                               Commissioner of Patents